(12) United States Patent
Shaanan

(10) Patent No.: US 7,961,829 B2
(45) Date of Patent: Jun. 14, 2011

(54) LOW JITTER CLOCK RECOVERY FROM A DIGITAL BASEBAND DATA SIGNAL TRANSMITTED OVER A WIRELESS MEDIUM

(75) Inventor: Tamir Shaanan, Herzlia (IL)

(73) Assignee: Infra-Com Ltd. (IL)

( * ) Notice: Subject to any disclaimer, the term of this patent is extended or adjusted under 35 U.S.C. 154(b) by 781 days.

(21) Appl. No.: 11/995,699

(22) PCT Filed: Jan. 26, 2006

(86) PCT No.: PCT/IL2006/000109
§ 371 (c)(1),
(2), (4) Date: Jan. 15, 2008

(87) PCT Pub. No.: WO2007/086043
PCT Pub. Date: Aug. 2, 2007

(65) Prior Publication Data
US 2008/0212729 A1    Sep. 4, 2008

(51) Int. Cl.
*H04L 7/00* (2006.01)
(52) U.S. Cl. .................................................. 375/354
(58) Field of Classification Search ........... 375/220, 375/257, 295, 316, 356, 371, 376; 370/503, 370/516
See application file for complete search history.

(56) References Cited

U.S. PATENT DOCUMENTS

| | | | |
|---|---|---|---|
| 5,075,880 A | 12/1991 | Moses | |
| 5,559,513 A | 9/1996 | Rothermel | |
| 5,596,603 A | 1/1997 | Haupt | |
| 5,907,295 A | 5/1999 | Lin | |
| 5,928,313 A | 7/1999 | Thompson | |
| 6,066,970 A | 5/2000 | Kawai | |
| 6,252,919 B1 | 6/2001 | Lin | |
| 6,285,726 B1 * | 9/2001 | Gaudet | 375/376 |
| 6,487,573 B1 | 11/2002 | Jiang | |
| 6,661,357 B2 | 12/2003 | Bland | |
| 7,088,398 B1 * | 8/2006 | Wolf et al. | 348/423.1 |
| 7,573,968 B2 * | 8/2009 | Natsume | 375/371 |
| 2003/0043945 A1 | 3/2003 | Mujica | |
| 2003/0172098 A1 | 9/2003 | Jiang | |
| 2004/0032350 A1 | 2/2004 | Knapp | |
| 2004/0090555 A1 | 5/2004 | Megeid | |
| 2004/0098149 A1 | 5/2004 | Liu | |
| 2004/0223622 A1 | 11/2004 | Lindemann | |
| 2006/0056563 A1 * | 3/2006 | Aweya et al. | 375/376 |

FOREIGN PATENT DOCUMENTS

| | | |
|---|---|---|
| EP | 0971491 | 1/2000 |
| EP | 1349386 | 10/2003 |
| WO | WO 01/99277 | 12/2001 |
| WO | WO 03/044950 | 5/2003 |

* cited by examiner

*Primary Examiner* — Khanh C Tran
(74) *Attorney, Agent, or Firm* — Galbreath Law Offices, P.C.; John A. Galbreath

(57) ABSTRACT

A system and method of transmitting a data stream from a data source over a baseband wireless communication system to one or more receivers. The receivers simultaneously recover the data and clock signals of the original data stream from the wireless transmitted data so that the data stream can be provided by the receivers to a data sink at the same rate as the original data stream, with low jitter performance.

21 Claims, 6 Drawing Sheets

Table 300

| Serial Clock (MHz) | Fs | L/R Clock (Hz) | Multiplier | Transmission Clock |
|---|---|---|---|---|
| 0.256 | 32 | 8,000 | 78 | 19.9680 |
| 0.384 | 48 | 8,000 | 52 | 19.9680 |
| 0.512 | 64 | 8,000 | 39 | 19.9680 |
| 1.0240 | 32 | 32,000 | 39/2 | 19.9680 |
| 1.5360 | 48 | 32,000 | 13 | 19.9680 |
| 2.0480 | 64 | 32,000 | 39/4 | 19.9680 |
| 1.4112 | 32 | 44,100 | 14 | 19.7568 |
| 2.1168 | 48 | 44,100 | 28/3 | 19.7568 |
| 2.8224 | 64 | 44,100 | 7 | 19.7568 |
| 1.5360 | 32 | 48,000 | 13 | 19.9680 |
| 2.3040 | 48 | 48,000 | 26/3 | 19.9680 |
| 3.0720 | 64 | 48,000 | 13/2 | 19.9680 |
| 2.8224 | 32 | 88,200 | 7 | 19.7568 |
| 4.2336 | 48 | 88,200 | 14/3 | 19.7568 |
| 5.6448 | 64 | 88,200 | 7/2 | 19.7568 |
| 3.0720 | 32 | 96,000 | 13/2 | 19.9680 |
| 4.6080 | 48 | 96,000 | 13/3 | 19.9680 |
| 6.1440 | 64 | 96,000 | 13/4 | 19.9680 |
| 6.1140 | 32 | 192,000 | 13/4 | 19.9680 |
| 9.2160 | 48 | 192,000 | 13/6 | 19.9680 |
| 12.288 | 64 | 192,000 | 13/8 | 19.9680 |

Fig. 3

Table 700

| Sample Rate | Transmission clock | 638 | APPL1 | 648 | APLL2 | 658 | D1 | 678 | D2 | 688 | D3 | 698 |
|---|---|---|---|---|---|---|---|---|---|---|---|---|
| 8,000 | 19.9680 | 1.248 | x128 | 159.7440 | /13, x8 | 98.3040 | /8 | 12.2880 | /48 | 0.2560 | /32 | 8,000 |
|  | 19.9680 | 1.248 | x128 | 159.7440 | /13, x8 | 98.3040 | /8 | 12.2880 | /32 | 0.3840 | /48 | 8,000 |
|  | 19.9680 | 1.248 | x128 | 159.7440 | /13, x8 | 98.3040 | /8 | 12.2880 | /24 | 0.5120 | /64 | 8,000 |
| 32,000 | 19.9680 | 1.248 | x128 | 159.7440 | /13, x8 | 98.3040 | /8 | 12.2880 | /12 | 1.0240 | /32 | 32,000 |
|  | 19.9680 | 1.248 | x128 | 159.7440 | /13, x8 | 98.3040 | /8 | 12.2880 | /8 | 1.5360 | /48 | 32,000 |
|  | 19.9680 | 1.248 | x128 | 159.7440 | /13, x8 | 98.3040 | /8 | 12.2880 | /6 | 2.0480 | /64 | 32,000 |
| 44,100 | 19.7568 | 1.2348 | x128 | 158.0544 | /14, x8 | 90.3168 | /8 | 11.2896 | /8 | 1.4112 | /32 | 44,100 |
|  | 19.7568 | 1.2348 | x128 | 158.0544 | /14, x8 | 90.3168 | /8 | 11.2896 | /4 | 2.8224 | /64 | 44,100 |
| 48,000 | 19.9680 | 1.248 | x128 | 159.7440 | /13, x8 | 98.3040 | /8 | 12.2880 | /8 | 1.5360 | /32 | 48,000 |
|  | 19.9680 | 1.248 | x128 | 159.7440 | /13, x8 | 98.3040 | /8 | 12.2880 | /4 | 3.0720 | /64 | 48,000 |
| 88,000 | 19.7568 | 1.2348 | x128 | 158.0544 | /14, x8 | 90.3168 | /8 | 11.2896 | /4 | 2.8224 | /32 | 88,000 |
|  | 19.7568 | 1.2348 | x128 | 158.0544 | /14, x8 | 90.3168 | /8 | 11.2896 | /2 | 5.6448 | /64 | 88,000 |
| 96,000 | 19.9680 | 1.248 | x128 | 159.7440 | /13, x8 | 98.3040 | /8 | 12.2880 | /4 | 3.0720 | /32 | 96,000 |
|  | 19.9680 | 1.248 | x128 | 159.7440 | /13, x8 | 98.3040 | /8 | 12.2880 | /2 | 6.1440 | /64 | 96,000 |
| 192,000 | 19.9680 | 1.248 | x128 | 159.7440 | /13, x8 | 98.3040 | /8 | 12.2880 | /2 | 6.1440 | /32 | 192,000 |
|  | 19.9680 | 1.248 | x128 | 159.7440 | /13, x8 | 98.3040 | /8 | 12.2880 | /1 | 12.288 | /64 | 192,000 |

Fig. 7

LOW JITTER CLOCK RECOVERY FROM A DIGITAL BASEBAND DATA SIGNAL TRANSMITTED OVER A WIRELESS MEDIUM

FIELD OF THE INVENTION

The present invention relates generally to low-jitter clock recovery from a digital data signal that originated from a data source and was transmitted over a wireless medium to a wireless receiver.

BACKGROUND OF THE INVENTION

In recent years many electronic devices that include remote parts as part of an entire system, and which were traditionally connected by wires or cables, are implemented using wireless links. An example of such a system is a home theater system with wireless speakers. The use of wireless speakers simplifies installation and enhances the freedom of positioning the speakers, since the speakers do not need to be connected by communication cables to a central device.

In a streaming data system, which transmits a data stream to remote wireless devices (e.g. a DVD or CD player that produces streaming audio data at its playback rate to wireless speakers), the data stream is provided at a specific rate, which is dictated by the data source. In some cases, a crystal or clock oscillator is used to set the data stream's clock rate, (e.g. when using an analog to digital data converter operating on analog based audio). Alternatively the data stream's clock rate is extracted from the data source, for example from a CD or DVD. In a wireless system the data stream is encoded and transmitted by a transmitter, typically at a higher transmission rate, to a receiver, which receives, decodes and stores the data stream in a local receiver buffer in order to recover the original data stream at the playback rate. The data stream is then extracted from the local receiver buffer, substantially at the same rate that it is originally provided to the transmitter, to produce an equivalent data stream at the receiver end, for example at multiple remote speakers.

In a wired system a synchronization line is typically used, providing a clock signal simultaneously to the transmitter and receiver to synchronize between the data source and its associated playback device. Typically, in a wireless system the receiver is not directly synchronized with the transmitter and needs to rely on its local crystal or local clock oscillator to recover the original data stream at substantially the rate it was originally provided to the transmitter. If there is a slight variance between these two rates (referred to as clock rate mismatch (CRM)), it will result in an overflow or underflow of the local receiver buffer, since the receiver will playback the data stream at a slightly different rate. In a typical wireless streaming data system, based on crystals, the variance is typically in the range of 30-200 parts per million (PPM). The variance introduces a problem in handling the local receiver buffer. If the receiver plays back the streaming data slower than the original playback rate it would cause an overflow of the local receiver buffer and a loss of data. In an audio system, as an example, the listener would hear clicks and pops in the audio signal (e.g. every few seconds). If the receiver plays back the data too fast it would cause an underflow of the local receiver buffer with similar phenomena.

Even if a system implementer uses crystals or clock oscillators from the same manufacturing batch at the transmitter and receiver to set their clock rates, there is always a slight difference between their operating rates due to physical tolerances introduced by the physical nature of the clocking devices. The extent of this discrepancy can be reduced by measuring many crystals and selecting those that have the closest values; however the problem can never be eliminated. The problem is more severe when there are multiple receivers, each with a slightly different rate, since they will not be synchronized to each other while playing back the data.

When transmitting a wireless audio data stream, a solution, which minimizes the noticeability by a listener of the clock rate mismatch between the transmitter and receiver is implemented by introducing warning marks, indicating that the high (full) and low (empty) ends of the local receiver buffer have been reached. A typical buffer for audio data may comprise a first in first out (FIFO) memory comprising a few hundred words (e.g. 128), wherein each word is a sample of a measurement of an analog audio signal (e.g. a 16 or 24 bit value). The low end warning mark represents a mark which is placed at a pre-selected distance from the low end of the buffer. The high end warning mark represents a mark which is placed at a pre-selected distance from the high end of the buffer. During wireless system usage, the local receiver buffer is filled in bursts by the higher rate transmission, and emptied continuously at substantially the data source audio playback rate plus or minus a small variance as described above. If the content of the local receiver buffer goes below the low end warning mark, one word value is repeated from the buffer. This keeps the playback data stream continuous, and provides a small delay that prevents the local receiver buffer from reaching its empty state before being refilled by the next wireless data transmission burst. It should be noted that the discrepancy between the clocks is very small so that one single repeated word value (e.g. a single audio sample) should be enough to fix clock rate mismatch accumulation. Additionally, since the original signal is generally a continuous signal, the repeated value is typically close to the real value so that it keeps the playback data stream continuous, and this discrepancy is generally, inaudible with playback audio.

Likewise, if the content of the buffer goes above the high end warning mark, one word value is discarded from the data stream in order to fix clock rate mismatch accumulation. As with the low end warning mark, a single discarded value is generally inaudible with playback audio and will prevent an overflow, which could cause more serious data loss when receiving a transmission.

The above method provides a relatively simple solution for adjusting between the original playback rate and the remote playback rate of a data stream, and in an audio data application is essentially inaudible to the human listener. However, this solution introduces harmonic distortion and generally degrades the total harmonic distortion (THD) performance of an audio signal relative to the original signal and is detectable by professional measuring equipment. The above solution is also unsatisfactory when the audio signal is rich with high frequency audio signal content (e.g. close to the sampling rate) so that the difference in value between two consecutive audio samples is significant, and any addition or removal of an audio sample is, in this case, audible to the human listener. Additionally, the solution is problematic for other types of data streams (e.g. non audio) where the loss of a sampled data value may be more noticeable or even catastrophic for the wireless system.

Another method, which provides a solution for handling clock rate mismatch (CRM), is known as sample rate conversion (SRC). In this method the receiver calculates intermediate values, between original data samples, using an interpolation scheme based on the received discrete sample data values. The receiver then re-samples this higher sampled rate signal using a decimation scheme to provide a newly sampled signal at the desired receiver playback rate. The receiver can therefore produce a digital (e.g. audio signal) essentially at any sampling rate, for example at the average of the original playback rate. In this case, local receiver buffer overflow and underflow are avoided.

U.S. Pat. No. 6,252,919 to LIN describes re-synchronization of independently clocked audio streams by fading in with a fractional sample over multiple periods for sample rate conversion.

The use of sample rate conversion requires a fast processor and/or a large memory area to perform complex calculations. Furthermore, an SRC scheme introduces THD to a certain extent, depending on the type and resolution (e.g. quantization) of the performed calculations. This increases the complexity and cost of the receivers making it less attractive as a solution, especially for mid to low end systems.

Another method of providing a solution for handling clock rate mismatch is by using a numerically controlled oscillator (NCO) in the receiver to continuously correct the receiver's playback clock frequency according to the original average playback rate. A numerically controlled oscillator can produce a synthetic frequency according to various system parameters. Examples of integrated circuits that can produce such an output are AD9830/3 and AD9852/4 from Analog Devices. As described above, the low and high warning marks in the local receiver buffer can be used to give indication if the receiver's NCO circuit is too fast or too slow. The NCO would then automatically correct itself to provide a slightly faster or slightly slower playback rate by the receiver according to the status of the local receiver buffer. Typically, the NCO clock rate converges quickly to a specific value, which is the average of the original playback rate.

U.S. patent publication No. 2003/0043945 to Mujica et al. describes an apparatus, system and method for synchronizing a local clock signal with a remote clock signal in a communication network using an NCO.

The use of a numerically controlled oscillator, as with an SRC scheme, tends to be complex to implement, and typically requires a large look up table (LUT) for generating the sine wave sample values, as well as an external digital to analog converter to provide for the continuous analog frequency clock signal. Therefore it would be preferable to find a simpler, less costly solution, which could rely on a crystal as a clock source without requiring a numerically controlled oscillator, which typically leads to a higher receiver cost.

U.S. patent application publication number 2004/0223622 to Lindemann et al., published on Nov. 11, 2004, the disclosure of which is incorporated herein by reference describes a digital wireless loudspeaker system, which wirelessly transmits digital audio data using an RF transmission system. In Lindemann et al. the data is modulated over an RF carrier signal and extracted from the carrier signal by the receivers.

In contrast to that described by Lindemann et al., in baseband transmission systems only raw data pulses, (e.g. '1' and '0' bits), without modulation over a frequency based carrier, are transmitted over the wireless medium for reconstruction of the data signal and its inherent clock signal in the receiver. Therefore Lindemann et al. would not be applicable to such systems.

SUMMARY OF THE INVENTION

An aspect of an embodiment of the invention relates to a system and method of transmitting a data stream from a data source over a baseband wireless communication system to one or more receivers. The receivers simultaneously recover the data and clock signals of the original data stream from the wireless transmitted data so that the data stream can be provided by the receivers to a data sink at the same rate as the original data stream.

In an exemplary embodiment of the invention, the original data stream is provided according to a base clock signal. The transmitter prepares a modulated and encoded data stream, from the original data stream that is synchronized with the base clock signal using a higher frequency clock, for example an L/K multiple of the frequency of the base clock signal (whereby L and K are integers). It should be noted that the base clock signal is inherently embedded in this converted and higher rate version of the original data stream. The transmitter then transmits the modulated and encoded data stream over the wireless medium to the receivers according to the higher frequency clock signal.

In an exemplary embodiment of the invention, a receiver receives the transmitted data stream and recovers a first clock signal, based on the wirelessly transmitted higher frequency converted data stream. Optionally, the first recovered clock signal suffers from jitter, wherein the clock period varies from the nominal cycle period by amounts as high as 25%. In an exemplary embodiment of the invention, the receiver uses the first recovered clock signal to recover a second clock signal with an average clock rate matched exactly to the transmitter's original base clock signal, but with variance in the clock cycle period (jitter) of less than 2% (which is fit for hi-fi audio playback applications).

In an exemplary embodiment of the invention, the first recovered clock signal is converted to a low frequency signal, wherein its jitter performance, defined as the ratio between jitter value and the signal clock cycle is very small (e.g. less than 2%). Optionally, by raising the clock frequency back to the level of the base clock signal, while not degrading jitter performance in a meaningful manner, there results a recovered second clock signal, which has the same rate as the original transmitter base clock signal, and has acceptable low jitter for the relevant needed applications, for example for a hi-fi audio application.

In an exemplary embodiment of the invention, the receiver provides multiple clock signals of different frequencies, which have deterministic rate relations with the transmitter base clock signal, in order to activate various devices in synchronization with the data stream.

In some embodiments of the invention, the wireless link uses infrared transmissions. The infrared transmissions can be direct, wide angle or diffused infrared transmissions.

In some embodiments of the invention, the data stream comprises audio data. Alternatively or additionally, the data stream comprises video data and simultaneously other types of data, for example control data.

There is thus provided according to an exemplary embodiment of the invention, a method of recovering a low jitter clock signal from a digital data stream transmitted over a baseband wireless network, including, defining a base clock signal for extracting the digital data stream from a data source device, modulating and encoding the digital data stream for transmission as a baseband data signal based on a transmission clock signal that is directly synchronized with the base clock signal, transmitting the modulated and encoded digital data stream as substantially even clocked data pulses over the baseband wireless network using the transmission clock signal synchronized with the base clock signal, receiving the transmitted modulated and encoded digital data stream by a receiver, recovering a recovered clock signal and a recovered data signal from the received modulated and encoded digital data stream at the rate of and synchronized with the transmission clock signal, by directly operating on the data pulses transmitted over the baseband wireless network, producing a low jitter playback clock signal from the recovered clock signal that is identical in rate to the base clock signal, demodulating and decoding the recovered data signal from the received modulated and encoded digital data stream using the recovered clock signal, into a playback digital data stream, and providing the playback digital data stream synchronously with the produced playback low jitter clock signal to a sink device. Optionally, the frequency of the transmission clock signal is a multiple of the base clock signal by the ratio of two integer values.

In some embodiments of the invention, the frequency of the transmission clock signal is greater than the frequency of the base clock signal. Optionally, the frequency of the playback clock signal is lower than the frequency of the recovered clock signal.

In some embodiments of the invention, the jitter performance of the recovered clock signal is larger than 2%. Optionally, the jitter performance of the playback clock signal is less than 2%.

In some embodiments of the invention, the baseband wireless network uses a direct or wide angle type of infrared transmissions. Optionally, the baseband wireless network uses a diffused infrared type of infrared transmissions.

In some embodiments of the invention, the digital data stream comprises audio data. Optionally, the digital data stream comprises video data.

In some embodiments of the invention, the digital data stream comprises audio and video data. Optionally, the method includes producing a set of clock signals of different frequencies from the receiver, wherein each clock of the set of clock signals has a rate with a specific constant multiplicity relation with the base clock signal and a jitter performance of less than 2%.

In some embodiments of the invention, the modulated and encoded data stream additionally comprises control information for programming the frequencies of the set of clock signals provided by the receiver. Optionally, the producing comprises reducing the frequency of the recovered clock signal to a frequency with a slower clock cycle to improve its relative jitter performance, and then raising the frequency of the resulting clock signal to a desired frequency level while maintaining the jitter performance below 2%.

In some embodiments of the invention, the method includes spreading of the jitter in the frequency with a slower clock cycle over many cycles of the resulting higher frequency signal. Optionally, the method includes use of a digital phase locked loop circuit.

There is thus additionally provided according to an exemplary embodiment of the invention, a system for recovering a low jitter clock signal from a digital data stream transmitted over a baseband wireless network, including, a transmitter, a transmitter clock processor circuit, at least one receiver, a receiver clock processor circuit embedded in each receiver, wherein the transmitter is adapted to accept the digital data stream from a data source device according to a base clock signal with a first frequency and transmit it as a wireless digital data stream to the at least one receiver over a baseband wireless network according to a second clock signal with a second frequency that is produced by the transmitter's clock processor circuit, wherein the second clock signal is synchronized with the base clock signal and the second frequency is a multiple of the first frequency, wherein the at least one receiver is adapted to receive the wireless digital data stream transmitted by the transmitter according to the second clock signal and recover and provide the digital data stream to a receiving device using a recovered low jitter playback clock signal, wherein the receiver clock processor is adapted to recover from the wireless digital data stream the recovered low jitter playback clock signal frequency with an average rate which is identical to the base clock signal with the first frequency and provide it synchronously with the digital data stream to the receiving device; and wherein the recovered playback clock signal has a jitter performance that is not greater than 2%.

In some embodiments of the invention, the frequency of the second clock signal is a multiple of the frequency of the base clock signal by the ratio of two integer values. Optionally, the at least one receiver provides a set of low jitter clock signals of different frequencies, each synchronized in rate with the recovered low jitter playback clock signal.

In some embodiments of the invention, the transmitter clock processor circuit measures the base clock signal and selects the multiple value according to the measured value. Optionally, the measured value is transmitted to the at least one receiver.

BRIEF DESCRIPTION OF THE DRAWINGS

The present invention will be better understood and appreciated from the following detailed description taken in conjunction with the drawings. Identical structures, elements or parts, which appear in more than one figure, are generally labeled with a same or similar number in all the figures in which they appear, wherein:

FIG. 3 is a table of multiplier/divider values for creating a high frequency transmission clock signal based on the frequency of the transmitter base clock signal, according to an exemplary embodiment of the invention;

FIG. 7 is a table of multiplier/divider values for creating various receiver side clock signals, according to an exemplary embodiment of the invention.

DETAILED DESCRIPTION OF THE INVENTION

Figure 1:
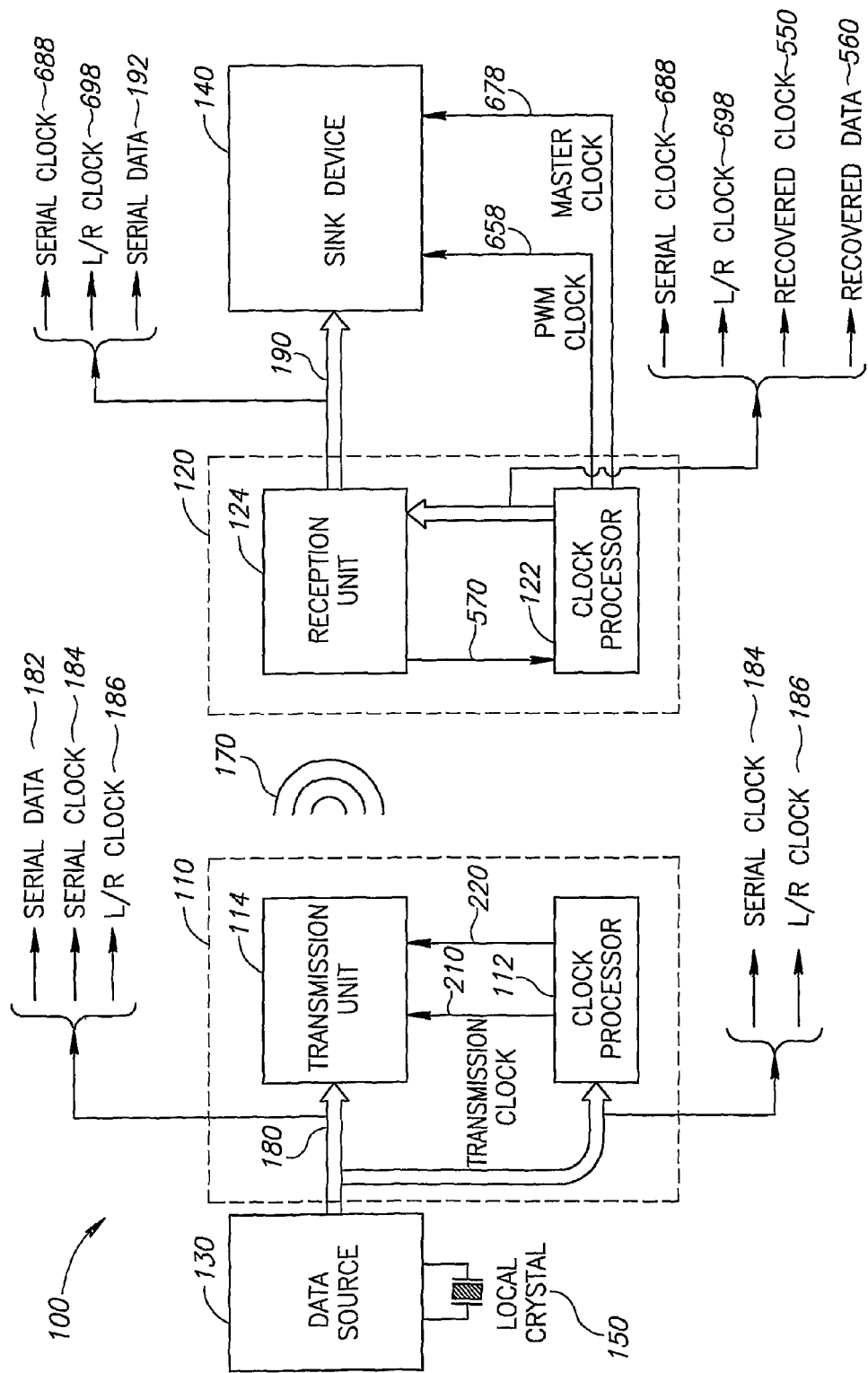
FIG. 1 is a schematic illustration of a wireless communication system, according to an exemplary embodiment of the invention.

FIG. 1 is a schematic illustration of a wireless communication system 100, according to an exemplary embodiment of the invention. In an exemplary embodiment of the invention, system 100 comprises a transmitter 110 and a receiver 120. Optionally, more than one receiver 120 can be implemented in system 100 for receiving data, for example a system that transmits audio data to multiple speakers. In an exemplary embodiment of the invention, transmitter 110 receives a digital data stream 180 from a data source 130, and transmits it to receiver 120.

In an exemplary embodiment of the invention, digital data stream 180 is transmitted as a wireless transmission 170 over a baseband wireless communication link (e.g. infrared). In a baseband wireless communication link, a data signal of binary data (e.g. in pulse form and not using a high frequency carrier), embedding an inherent clock signal, is transmitted from the transmitter to the receiver. In an exemplary embodiment of the invention, the inherent clock signal embedded in the data signal is used in receiver 120 to recover the clock signal originally used for providing digital data stream 180, in order to match data rates between the provision of the streaming data to a sink device in the receiver, and the playback of digital data stream 180 from the data source. In some embodiments of the invention, the wireless transmission method may use various methods of infra-red optical transmission, for example direct, wide-angled or diffused infrared.

In some embodiments of the invention, the data source is an audio source and/or an audio/video source, or comprises other types of digital streaming data, which are to be provided to a remote electronic device at the same rate that they are provided to transmitter 110 by data source 130. In some embodiments of the invention, data source 130 is a device external to system 100, for example a radio, MP3 player, cellular phone with built in audio/video capabilities, high definition television or satellite receiver. Alternatively data source 130 may be embedded in system 100 with transmitter 110, for example wherein transmitter 110 is part of a home theater DVD system or an amplifier. In an exemplary embodiment of the invention, data source 130 extracts the digital streaming data from a DVD or CD, for example using an MPEG chip to expand compressed audio and/or video data and produce digital data stream 180. Optionally, the clock signal for controlling the rate of digital data stream 180 is given by a crystal 150.

In an exemplary embodiment of the invention, digital data stream 180 is provided as a pulse code modulated (PCM) audio signal, employing the inter IC sound ($I^2S$) bus standard (Philips, 1986) that comprises a serial data signal 182, a serial clock signal 184 and a (Left/Right) L/R clock signal 186. Serial clock signal 184 provides clocking for serial data signal 182, and is synchronous to it. L/R clock signal 186 is also synchronous to serial clock signal 184 and provides a lower rate clock cycle that represents the timing of a full audio sample value comprising left and right channel data of the audio signal. The cycle period of the L/R clock signal 186 is an integer multiple of serial clock signal 184 depending on the number of bits used to sample the audio data, for example 48 serial clock cycles are embedded within one L/R clock signal cycle to represent audio data sampled at 24 bits per sample.

In an exemplary embodiment of the invention, transmitter 110 comprises a clock processor unit 112 and a transmission unit 114. Optionally, clock processor unit 112 provides a clock signal for the function of transmitter 110, and transmission unit 114 processes digital data stream 180 and wirelessly transmits it to receiver 120.

Figure 2:
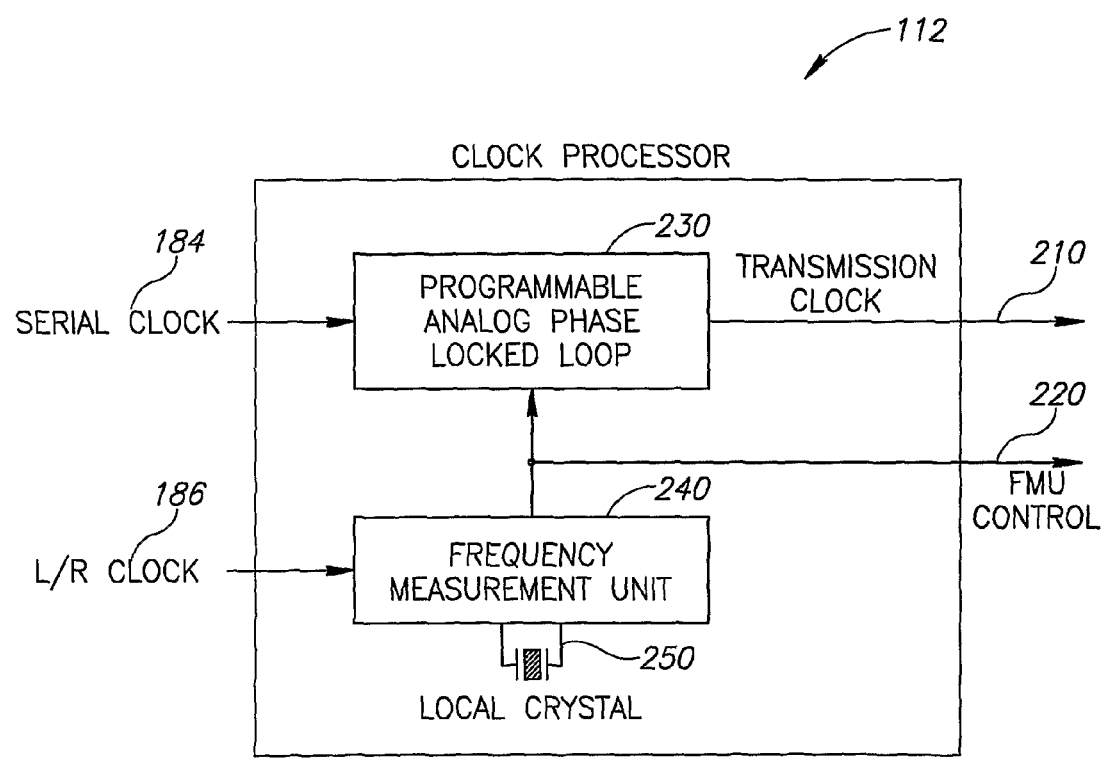
FIG. 2 is a schematic illustration of the transmitter clock processor unit of the wireless communication system, according to an exemplary embodiment of the invention.

FIG. 2 is a schematic illustration of clock processor unit 112 embedded within transmitter 110, according to an exemplary embodiment of the invention. In an exemplary embodiment of the invention, clock processor unit 112 provides a transmission clock signal 210, which is a multiple (e.g. by a fraction N/M that is the ratio of two integers) of serial clock signal 184 from digital data stream 180. In an exemplary embodiment of the invention, clock processor unit 112 comprises a programmable multiplier 230 and a frequency measurement unit (FMU) 240. Optionally, frequency measurement unit 240 is fed with L/R clock signal 186 from digital data stream 180. Frequency measurement unit 240 measures L/R clock signal 186 using a frequency provided by a crystal 250 to determine the audio sample frequency used by L/R clock signal 186. In an exemplary embodiment of the invention, the frequency of crystal 250 is a much higher frequency than the frequency of L/R clock signal 186 in order to enable it to accurately sample the L/R clock signal frequency, for example 27 MHz relative to 8, 11.025, 22.05, 32, 44.1 48, 88.2, 96 or 192 KHz, which are typical audio sample frequencies used for providing an audio digital data stream.

In an exemplary embodiment of the invention, FMU 240 uses a look up table (LUT) or a pre-determined function to select an FMU control value (e.g. N/M—the ratio of two integers) to be used to multiply serial clock signal 184. Optionally, the FMU control value is provided by FMU control lines 220 to programmable multiplier 230 and optionally also to transmission unit 114 to be used to set various parameters, like the type of baseband modulation to be used to transmit wireless data over the wireless link. In an exemplary embodiment of the invention, programmable multiplier 230 accepts as input serial clock signal 184 and multiplies its frequency to produce transmission clock signal 210, which feeds transmission unit 114 as its operational clock. Optionally, the FMU control value selected by FMU 240 is pre-selected so that transmission clock signal 210 will always be approximately the same frequency, for example about 20 MHz, regardless of the value of serial clock signal 184. In an exemplary embodiment of the invention, the resulting clock signal—transmission clock signal 210 is synchronized with serial clock signal 184 although it has a higher frequency.

FIG. 3 is a table 300 of multiplier values for creating transmission clock signal 210 based on the frequency of serial clock signal 184 of digital data stream 180, according to an exemplary embodiment of the invention. The first column of table 300 provides typical serial clock frequencies in MHz, which are commonly used for providing a serial clock of an audio digital data stream. The second column of table 300 (designated by Fs) provides optional values for the number of serial clock cycles commonly used in one L/R clock signal cycle of an audio digital data stream 180. The third column of table 300 provides the L/R clock signal frequency in Hz resulting from the two previous columns (L/R clock signal= (serial clock signal)/(Fs)). The fourth column of table 300 provides the multiplier value (N/M) provided by frequency measurement unit 240 for multiplying serial clock signal 184 to produce the desired transmission clock 210 for clocking transmission unit 114. Column five shows the resulting transmission clock frequency 210 that is provided by clock processor 112 for driving transmission unit 114. It should be noted that the values in table 300 are exemplary values and other values may be used for implementing transmitter 110 and system 100.

In some embodiments of the invention, system 100 deals with digital data stream 180, which is supplied at substantially specific frequencies (e.g. as shown in table 300), since the device supplying digital data stream 180 is limited to specific playback rates, for example when the device deals with providing audio. Alternatively, a function may be used to select the frequency of transmission clock 210 based on serial clock signal 184 provided by data source 130.

In an exemplary embodiment of the invention, programmable multiplier 230 is a programmable analog phase locked loop (APLL), which can multiply a continuous input clock signal by an exact value (N/M), and output a signal synchronized with the input signal but with a multiplied frequency. Many manufacturers supply analog phase locked loops in discrete form, for example Texas Instruments, AMIS, ICST and others. Additionally, many manufacturers supply analog phase locked loops as in an IP core form, for example Faraday (Taiwan), CEVA (Ireland) and ChipIdea (Portugal).

In an exemplary embodiment of the invention, an APLL, is capable of accepting an input serial clock signal with degraded jitter performance (for example 3%-4%) and enhance its jitter performance by outputting a multiplied frequency with a reduced jitter level (e.g. 2%).

Figure 4:
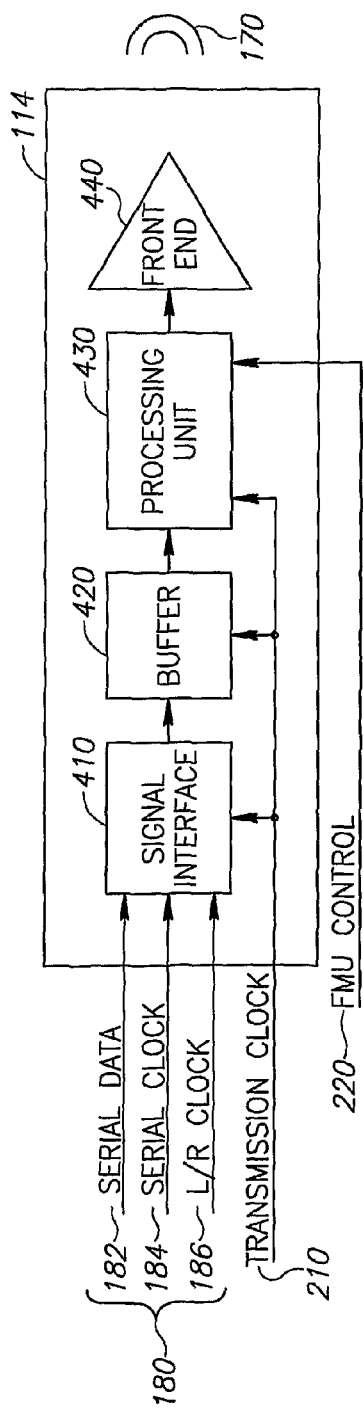
FIG. 4 is a schematic illustration of the transmitter unit of the wireless communication system, according to an exemplary embodiment of the invention.

FIG. 4 is a schematic illustration of transmission unit 114 of transmitter 110, according to an exemplary embodiment of the invention. In an exemplary embodiment of the invention, transmission unit 114 comprises a signal interface unit 410, a buffer 420, a processing unit 430 and a transmission front end 440. Optionally, signal interface unit 410 accepts digital data stream 180 from data source 130, and processes this data stream into a generic form so that the data stream can be fed into buffer 420. In an exemplary embodiment of the invention, signal interface 410 provides a continuous stream of pairs of digital sample data values (for the left and right channels of a digital audio data stream) to buffer 420 at the clock rate provided by L/R clock signal 186 of digital data signal 180. Optionally, buffer 420 serves as a first in first out (FIFO) buffer so that the digital data stream will continue in sequence to processing unit 430. In an exemplary embodiment of the invention, buffer 420 serves as a rate changer (e.g. elastic buffer) for the data of digital data stream 180. Optionally, buffer 420 is written with digital data at a slow frequency (e.g. audio/video playback rate), and the data is read (retrieved) out of the buffer when a specific number of digital data values are collected together to form a block of data. The block of data is then transmitted over the wireless medium at a higher rate (e.g. burst transmission) specified by transmission clock 210. In an exemplary embodiment of the invention, processing unit 430 accepts the block of data and prepares it for transmission over the wireless link as a base-band modulated and encoded signal. In an exemplary embodiment of the invention, processing unit 430 provides control headers for the transmission, scrambling, encryption, modulation, encoding (e.g. forward error correction (FEC)) and other baseband digital signal processing (DSP) functions required to process the digital data stream being dealt with. Optionally, after performing digital signal processing, processing unit 430 provides the signal to transmission front end 440 for transmission as wireless transmission 170. In an exemplary embodiment of the invention, the serial data from digital data stream 180 is transmitted in bursts of a block at a time, wherein each block of data is modulated, encoded and enveloped by control data and header information and transmitted at the higher rate provided by transmission clock 210 with a low jitter level, for example less than 2%.

In some embodiments of the invention, transmission front end 440 comprises a LED, Laser Diode, Laser or other means for transmitting an infrared optical signal or other types of devices used to transmit baseband type signals.

In an exemplary embodiment of the invention, as shown in FIG. 1, receiver 120 comprises a reception unit 124, and a clock processor unit 122. Optionally, reception unit 124 accepts wireless transmissions as transmission bursts from transmitter 110 in order to recover digital data stream 180 and provide it to a sink device 140 at the receiver side. In an exemplary embodiment of the invention, sink device 140 is an audio device (e.g. a speaker), a video reception device (e.g. a digital TV) or any other device which accepts a data stream. In an exemplary embodiment of the invention, clock processor unit 122 analyzes the received baseband transmission for recovering a raw data signal for further processing, and a set of clock signals based on the high frequency clock signal used by transmitter 110. Optionally, the recovered set of clock signals are used to control reception unit 124 so that digital data stream 180 will be recovered and provided to sink device 140 at the same rate as it was originally provided to transmitter 110 by data source 130. It should be noted that the method described enables multiple receivers 120 to recover digital data stream 180 substantially at the same rate as it was originally provided to transmitter 110 and in synchronization to each other. Optionally, transmitter 110 may provide instructions for specific receivers 120 to discard part of the recovered data stream and only provide their associated sink device 140 with data that is intended for the specific receiver, for example to implement a multiple speaker system.

Figure 5:
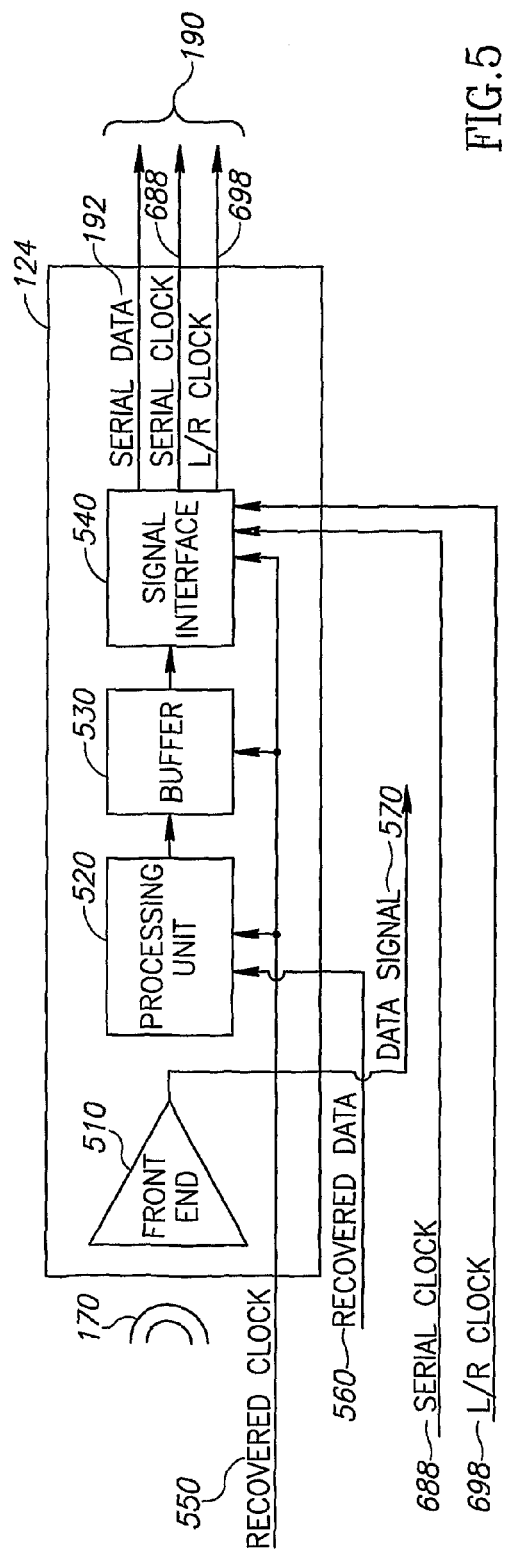
FIG. 5 is a schematic illustration of the receiver unit of the wireless communication system, according to an exemplary embodiment of the invention.

FIG. 5 is a schematic illustration of reception unit 124 of receiver 120, according to an exemplary embodiment of the invention. In an exemplary embodiment of the invention, reception unit 124 comprises a reception front end unit 510 for accepting wireless transmissions from transmitter 110. Optionally, reception front end 510 comprises physical reception means, for example photodiodes for receiving an infrared optical signal. In some embodiments of the invention, reception front end 510 includes a low noise amplifier to amplify the signal received by the physical reception means. Optionally, reception front end 510 also includes an automatic gain control (AGC) circuit for regulating signal amplification. Additionally, reception front end 510 includes a post amplification circuit to further amplify the signal and a decision circuit to determine the value of an arriving pulse (bit).

In an exemplary embodiment of the invention, once the received signal is stabilized by the reception front end's amplification track (e.g. in a few micro-seconds), it is transferred as a stabilized data signal 570 to clock processor unit 122 for recovering of a recovered clock signal 550 (with the same average rate as the transmission clock 210 used by transmission unit 114), and for recovering a raw data signal 560 from wireless transmission 170, after it is filtered out of noise and interference. Recovered clock signal 550 is used to clock reception unit 124, and to form a recovered digital data stream 190, which is the playback data at the receiver side and essentially identical to digital data stream 180, precluding errors which might have occurred over the wireless link. Recovered data stream 560 includes communication control data, for example a preamble and address header. Data stream 560 is transferred to processing unit 520 for extracting the original digital data stream, without the extra communication information. Optionally, processing unit 520 analyzes data stream 560, discards transmissions that are not addressed to the receiver, processes and then removes header information, demodulates the signal, decodes it and corrects errors, for example using a forward error correction decoding scheme.

In an exemplary embodiment of the invention, the extracted data is stored in a FIFO buffer 530. Optionally, wireless transmission 170 provides communication bursts, supplying a block of data at a time, which is stored using the recovered clock 550 into buffer 530. In an exemplary embodiment of the invention, the data in buffer 530 is continuously read and then provided at the original data playback rate, which is lower in frequency than the transmission rate 210, to a signal interface 540. In an exemplary embodiment of the invention, signal interface 540 is also provided with a serial clock signal 688 and a L/R clock signal 698, which are produced by clock processor 122, as described below in more detail regarding FIG. 6. Optionally, signal interface 540 forms a recovered serial data signal 192 from recovered data 560, corresponding to original serial data signal 182, after filtering out additions such as control information. In an exemplary embodiment of the invention, signal interface 540 formulates continuous digital data stream 190 from serial data signal 192 and provides it in sync with serial clock signal 688 and L/R clock signal 698 to sink device 140. In an exemplary embodiment of the invention the data in formulated digital data stream 190 is essentially identical to serial data 182, and the respective serial clocks associated with these data signals match in rate. In an exemplary embodiment of the invention, by recovering the clock rate used for transmitting serial data 182, and using it to formulate digital data stream 190, underflow and overflow of buffer 530 is avoided, and there is no need to discard or repeat sample data values, thus avoiding signal degradation and distortion.

Figure 6:
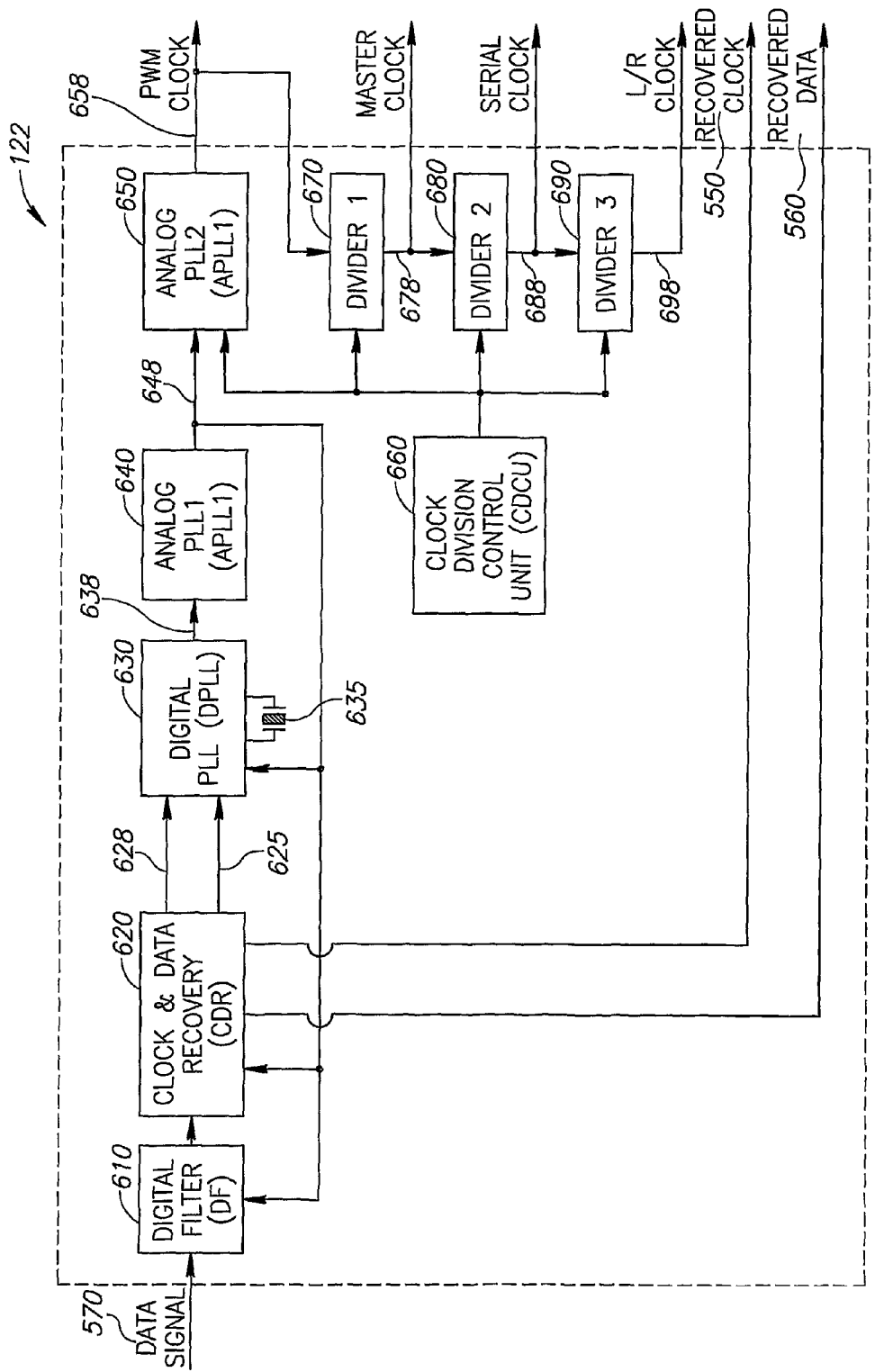
FIG. 6 is a schematic illustration of the receiver clock processor unit of the wireless communication system, according to an exemplary embodiment of the invention.

FIG. 6 is a schematic illustration of clock processor unit 122 in receiver 120, according to an exemplary embodiment of the invention. In an exemplary embodiment of the invention, stabilized received data signal 570 is accepted by clock processor unit 122 to recover a set of clock signals for clocking receiver 120, provide appropriate clock signals to sink device 140 and correctly form raw data signal 560 from the wireless transmission. In an exemplary embodiment of the invention, stabilized received data signal 570 is accepted by a digital filter 610 to filter out wireless channel noise and interference from the signal. Optionally, digital filter 610 employs various digital signal processing (DSP) algorithms, for example methods of detecting and removing foreign data pulses. In an exemplary embodiment of the invention, the signal is then provided to a clock and data recovery (CDR) unit 620. Optionally, CDR unit 620 uses a high rate clock (higher than the transmission rate, for example the transmission rate frequency multiplied by 8) to sample the signal and recover recovered clock 550, which is synchronized by rate with serial clock signal 182 although it is a higher rate clock signal. Likewise CDR unit 620 recovers and provides raw data signal 560 from wireless transmission 170. Optionally, recovered data signal 560 is a well defined digital signal, comprising zero and one bit values in sync with local clock 550, which is a well defined clock signal.

In an exemplary embodiment of the invention, transmission over the wireless medium impairs the well formed signal that is originally transmitted by transmitter 110 as a result of noise and environmental interference of various kinds (e.g. fluorescent lamps, sunlight, plasma TV and the like). As a result, even though the received baseband signal is in sync with the transmitted signal, the received signal suffers from considerable jitter such that the '1' and '0' bit intervals (pulses) are not of equal width. Consequently, the inherent clock signal embedded within stabilized data signal 570 is less distinct and much harder to extract out of the arriving wireless data signal. Additionally, the operational sampling rate resolution of CDR unit 620 is limited to a specific accuracy by the high rate clock cycle it works on (signal 648—as explained below), so that the width of a clock pulse in recovered clock 550 or width of a data bit in recovered data signal 560 may be off by 20-30% relative to the nominal width of the clock/data signal before being transmitted over the wireless medium by transmitter 110. In an exemplary case, transmitter 110 transmits pulses of about 50 ns (a frequency of about 20 MHz). CDR unit 620 samples stabilized data signal 570 at the rate of about 160 MHz (with a cycle of about 6.25 ns). Therefore the accuracy of the recovery of a data pulse (either '1' or '0') can be performed just up to a resolution of +/−6.25 ns, producing an inherent inaccuracy of up to 12.5/50=25%. Typically in audio streaming data, an inaccuracy (jitter) of more than 2% is noticeable to the human listener, so that recovering digital data stream 180 at receiver 120 with a jitter greater than 2% is unacceptable.

In an exemplary embodiment of the invention, recovered clock 550 and recovered data 560 are further processed by reception unit 124 to recover and extract the raw data from wireless transmission 170 to be fed to sink device 140 via digital data stream 190. A set of clock signals (typically with a jitter of not greater than 2%) and synchronized by rate with data stream 180, are provided to sink device 140 along with digital data stream 190 that is substantially identical to data stream 180.

In an exemplary embodiment of the invention, the remaining units of clock processor 122 recover serial clock signal 688 and L/R clock signal 698, which essentially match serial clock signal 184 and L/R clock signal 186 respectively, all having low jitter. Additionally, clock processor 122 provides a PWM clock 658 and a Master clock 678, which are frequencies typically required by audio streaming systems for interfacing to various sink devices 140.

In an exemplary embodiment of the invention, CDR unit 620 additionally comprises an internal divider (e.g. counter), to provide a clock signal 628 with a lower rate frequency, but much improved jitter performance. Optionally, recovered clock 550 is divided internally within CDR 620 by a relatively large number to form a lower frequency clock signal 628 that is synchronized with local clock 550. Optionally, clock signal 628 has a slower clock cycle but with substantially the same order of absolute jitter as recovered clock 550. As a result, the relative jitter of the lower frequency clock signal is greatly reduced. As an example, if the recovered clock 550 rate is divided by 320, from 20 MHz (50 ns) to 62.5 KHz (16,000 ns), with an inaccuracy in pulse width due to jitter of only several +/−6.25 ns sampling clock cycles, this gives a resulting jitter for the lower frequency clock signal that is less than 1%. The resulting low jitter clock signal is a very good basis for further processing.

In an exemplary embodiment of the invention, after creating a low frequency clock signal 628 with improved low jitter performance, clock processor 122 further transforms this signal to a clock signal with a higher clock rate, but with a jitter performance that is not greater than 2%. Clock processor 122 will then use simple divider circuits, which can reduce a high frequency signal to a set of low frequency clock signals to be provided to sink device 140, along with a data signal that is synchronized to these set of clock signals.

In an exemplary embodiment of the invention, lower frequency clock signal 628 is provided to a digital phase locked loop (DPLL) 630 for raising its rate up to a value which can be conveniently handled by common analog PLL circuits. DPLL circuits are well known in the art and consist of a digital logic circuit imitating analog phase locked loop functionality. Optionally, DPLL 630 raises the clock rate of signal 628 to about 1.25 MHz (with a clock cycle of about 800 ns), for example by multiplying by 20. In an exemplary embodiment of the invention, by keeping the absolute jitter at no more than the sampling clock resolution of +/−6.25 ns results in a jitter performance of 12.5/800=1.56%. In an exemplary embodiment of the invention, DPLL 630 keeps its absolute output jitter at no more than +/−one sampling clock resolution by spreading the still remaining jitter in lower frequency clock signal 628 over many cycles of DPLL's 630 output signal 638. Optionally, low jitter signal 638 is provided to the next unit in clock processor 122, first analog phase locked loop (APLL1) 640.

In an exemplary embodiment of the invention, DPLL 630 is fed by a crystal 635, which provides a central frequency similar to the frequency that is generally provided by DPLL 630 (e.g. 1.25 MHz). Optionally, crystal 635 is used for providing an initial clock signal that is used by clock processor 122 for the function of circuits 610, 620, 630 as described above and circuit 640 as will be described herein below. Initially, the crystal provides output 638 instead of DPLL 630, so that APLL1 640 can use this clock frequency to raise it to a higher rate sampling frequency 648, as required by circuits 610, 620, 630 and 650. However, once a wireless transmission 170 exists, and a recovered, low frequency clock signal 628, synchronized to the original transmission clock 210 appears, DPLL 630 switches to work on clock signal 628 instead of the crystal, as long as wireless transmission 170 is transmitting over the wireless medium. Whenever wireless transmission 170 disappears from the wireless medium, DPLL 630 switches again to be fed from crystal 635 to maintain an operative loop in standby mode for the next session of wireless transmission 170. Optionally, CDR 620 provides a control line 625 to signal DPLL 630 if a recovered low frequency clock signal is passing through to DPLL 630, so that it can transition to work on it and not on crystal 635.

In an exemplary embodiment of the invention clock signal 638 is provided to a first analog phase locked loop circuit, APLL1 640. Optionally, APLL1 640 raises the frequency of clock 638 by multiplying it by a relatively large value (e.g. 128), forming a high frequency sampling clock signal with no degradation in jitter performance. The output of APLL1 640 (e.g. 160 MHz—marked as 648 in FIG. 6) is used in a closed loop to sample data signal 570, and for the function of circuits 610, 620 and 630.

In an exemplary embodiment of the invention, clock signal 648 is further processed (e.g. multiplied and/or divided) by four units: APLL2 650, divider1 670, divider2 680, and divider3 690. These four units produce four clock signals that are synchronized in rate with original serial clock 184, but all having low jitter performance (e.g. typically less than 2%) which is fit for audio/video applications. Optionally, the values by which clock signal 648 is multiplied and/or divided may depend on the original playback rate of the provided content in the transmitter, for example according to various standard audio rates such as 8, 11.025, 22.05, 32, 44.1, 48, 88.2, 96, and 192 KHz. In some receiver devices only specific rates are supported, so the multiplication and/or division values are pre-programmed in the receiver device. Alternatively, transmitter 110 provides the multiplier and/or division parameters for unit's 650, 670, 680 and 690 operation, for example by providing these values in the header part of the burst transmissions. These values are then provided to and stored in a clock division control unit (CDCU) 660, for example by receiver processor 520, which analyzes the content of the transmitted data and its accompanying control information. Optionally, CDCU 660 actively programs the necessary multiplier and/or division parameters to the four units (APLL2 650, divider1 670, divider2 680, and divider3 690).

In some embodiments of the invention, these values change only when the data stream from the data source is changed, for example when playing a different CD or DVD. Alternatively, these values may be affected by a selection dial or a remote control device at the transmitter side, and may be changed by the will of a user.

In an exemplary embodiment of the invention, APLL2 650 generates a PWM clock signal 658 for use in sink devices that require an audio pulse width modulated signal. Optionally, signal 648 is multiplied by a fractional value (P/Q—the ratio of two integer values) using APLL2 to generate a signal 658, which is typically in the range of 100 MHz.

In an exemplary embodiment of the invention, divider1 670 is used to generate master clock signal 678, divider2 680 is used to generate serial clock signal 688, which is substantially an identical recovery of the original rate of serial clock 184, divider3 690 is used to generate L/R clock signal 698, which is substantially an identical recovery of the original rate of L/R clock signal 186.

In an exemplary embodiment of the invention, as shown in FIG. 6, the multipliers/dividers are arranged in a cascade wherein each unit acts on the signal resulting from the previous unit. Alternatively, all units could be provided with signal 648 and the multiplication/division factors adjusted accordingly.

In some embodiments of the invention, the use of a cascade of two analog PLLs, namely APLL1 640 and APLL2 650, as shown in FIG. 6, further reduces and filters jitter, thus improving jitter performance.

FIG. 7 is a table 700 of multiplier/divider values for creating clock signals 638, 648, 658, 678, 688 and 698, taking into account the audio sample rate according to an exemplary embodiment of the invention, as described above. As can be seen by comparing the value of serial clock signal 184 in table 300 to serial clock signal 688 in table 700, the recovered serial clock matches the original serial clock produced in the transmitter. Likewise the value of the transmitter's L/R clock signal 186 and L/R clock signal 698 match each other.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the invention. Further combinations of the above features are also considered to be within the scope of some embodiments of the invention.

Section headings are provided for assistance in navigation and should not be considered as necessarily limiting the contents of the section.

It will be appreciated by persons skilled in the art that the present invention is not limited to what has been particularly shown and described hereinabove. Rather the scope of the present invention is defined only by the claims, which follow.

The invention claimed is:

1. A method of recovering a low jitter clock signal from a digital data stream transmitted over a baseband wireless network, comprising:

defining a base clock signal for extracting the digital data stream from a data source device;

modulating and encoding the digital data stream for transmission as a baseband data signal based on a transmission clock signal that is synchronized with said base clock signal;

transmitting the modulated and encoded digital data stream as even clocked data pulses over the baseband wireless network using the transmission clock signal synchronized with said base clock signal;

receiving said transmitted modulated and encoded digital data stream by a receiver;

recovering a first clock signal and a recovered data signal from said received modulated and encoded digital data stream at the rate of and synchronized with said transmission clock signal, wherein said first clock signal suffers from a relatively high clock period variance known as jitter;

dividing the frequency of said first clock signal to produce a second clock signal with a lower frequency having the same order of absolute jitter as the first clock signal, such that the resulting jitter relative to the second clock signal period is lower than for the first clock signal;

producing a low jitter playback clock signal from said second clock signal that is identical in rate to said base clock signal by multiplying and dividing the frequency of the second clock signal with a series of multipliers and dividers such that the jitter of a created clock signal is spread evenly over multiple cycles, resulting in a low jitter playback clock signal;

demodulating and decoding said recovered data signal from said received modulated and encoded digital data stream using said low jitter playback clock signal, into a playback digital data stream; and providing said playback digital data stream synchronously with said produced low jitter playback clock signal to a sink device.

2. A method according to claim 1, wherein the frequency of said transmission clock signal is a multiple of said base clock signal by the ratio of two integer values.

3. A method according to claim 1, wherein the frequency of said transmission clock signal is greater than the frequency of said base clock signal.

4. A method according to claim 1, wherein the frequency of said low jitter playback clock signal is lower than the frequency of said recovered first clock signal.

5. A method according to claim 1, wherein the jitter of said recovered first clock signal is larger than 2%.

6. A method according to claim 1, wherein the jitter of said low jitter playback clock signal is less than 2%.

7. A method according to claim 1, wherein said baseband wireless network uses a direct or wide angle type of infrared transmissions.

8. A method according to claim 1, wherein said baseband wireless network uses a diffused infrared type of infrared transmissions.

9. A method according to claim 1, wherein said digital data stream comprises audio data.

10. A method according to claim 1, wherein said digital data stream comprises video data.

11. A method according to claim 1, wherein said digital data stream comprises audio and video data.

12. A method according to claim 1, further comprising producing a set of clock signals of different frequencies from the receiver, wherein each clock of said set of clock signals has a rate with a specific constant multiplicity relation with said base clock signal and a jitter of less than 2%.

13. A method according to claim 12, wherein said modulated and encoded data stream additionally comprises control information for programming the frequencies of said set of clock signals provided by the receiver.

14. A method according to claim 1, wherein the jitter of said first clock signal is between 20%-30%.

15. A method according to claim 1, wherein the jitter of said second clock signal is less than 2%.

16. A method according to claim 1, comprising using a digital phase locked loop circuit to raise the frequency of said second clock signal.

17. A system for recovering a low jitter clock signal from a digital data stream transmitted over a baseband wireless network, comprising:
 a transmitter;
 a transmitter clock processor circuit;
 at least one receiver;
 a receiver clock processor circuit embedded in each receiver;

wherein said transmitter is adapted to accept the digital data stream from a data source device according to a base clock signal with a first frequency and transmit it as a modulated and encoded wireless digital data stream to the at least one receiver over a baseband wireless network according to a transmission clock signal with a second frequency that is produced by said transmitter's clock processor circuit;

wherein said transmission clock signal is synchronized with said base clock signal and said second frequency is a multiple of said first frequency wherein said at least one receiver is adapted to receive said modulated and encoded wireless digital data stream transmitted by said transmitter according to said transmission clock signal; and wherein said receiver clock processor is adapted to:

recover a first clock signal and a recovered data signal from said received modulated and encoded digital data stream at the rate of and synchronized with said transmission clock signal, wherein said first clock signal suffers from a relatively high clock period variance known as jitter;

divide the frequency of said first clock signal to produce a second clock signal with a lower frequency having the same order of absolute jitter as the first clock signal, such that the resulting jitter relative to the second clock signal period is lower than for the first clock signal;

produce a low jitter playback clock signal from said second clock signal that is identical in rate to said base clock signal by multiplying and dividing the frequency of the second clock signal with a series of multipliers and dividers such that the jitter of a created clock signal is spread evenly over multiple cycles, resulting in a low jitter playback clock signal;

demodulate and decoding said recovered data signal from said received modulated and encoded digital data stream using said low jitter playback clock signal, into a playback digital data stream; and provide said playback digital data stream synchronously with said produced low jitter playback clock signal to a sink device.

18. A system according to claim 17, wherein the frequency of said transmission clock signal is a multiple of the frequency of said base clock signal by the ratio of two integer values.

19. A system according to claim 17, wherein said at least one receiver provides a set of low jitter clock signals of different frequencies, each synchronized in rate with said recovered low jitter playback clock signal.

20. A system according to claim 17, wherein said transmitter clock processor circuit measures said base clock signal and selects said multiple value according to the measured value.

21. A system according to claim 20, wherein said measured value is transmitted to said at least one receiver.

* * * * *